US007064716B2

(12) United States Patent
Deguchi et al.

(10) Patent No.: US 7,064,716 B2
(45) Date of Patent: Jun. 20, 2006

(54) INTEGRATED ANTENNA TYPE NON-CONTACT IC CARD READER/WRITER

(75) Inventors: Futoshi Deguchi, Fukuoka (JP);
Hiroshi Yoshinaga, Kasuya-gun (JP);
Akihiko Hirata, Fukuoka (JP);
Masahiko Tanaka, Maebaru (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/742,796

(22) Filed: Dec. 23, 2003

(65) Prior Publication Data
US 2004/0140360 A1 Jul. 22, 2004

(30) Foreign Application Priority Data
Dec. 24, 2002 (JP) ............................ P2002-372220
Dec. 24, 2002 (JP) ............................ P2002-372221

(51) Int. Cl.
*H01Q 1/24* (2006.01)
*H01Q 1/52* (2006.01)

(52) U.S. Cl. ..................................... 343/702; 343/841
(58) Field of Classification Search ................ 343/904, 343/905, 906, 907, 700 MS, 702, 841, 741, 343/866; 235/380, 381, 382, 492
See application file for complete search history.

(56) References Cited

U.S. PATENT DOCUMENTS 5,315,096 A 5/1994 Muller et al. ............... 235/462

| 5,710,458 | A | * | 1/1998 | Iwasaki ..................... 257/679 |
| 5,773,880 | A | * | 6/1998 | Ohno ......................... 257/679 |
| 5,821,525 | A | * | 10/1998 | Takebayashi ............... 235/492 |
| 6,342,869 | B1 | | 1/2002 | Edvardsson et al. ........ 343/841 |
| 6,466,131 | B1 | | 10/2002 | Tuttle et al. ............. 340/572.7 |
| 6,641,035 | B1 | * | 11/2003 | Predescu et al. ............ 235/380 |
| 6,837,438 | B1 | * | 1/2005 | Takasugi et al. ............ 235/492 |

FOREIGN PATENT DOCUMENTS

| EP | 1227434 | 7/2002 |
| JP | 200263552 | 2/2002 |
| JP | 2002279362 | 9/2002 |

OTHER PUBLICATIONS

European Search Report dated Dec. 6, 2004.
Patent Abstracts of Japan, vol. 1999, No. 13, Nov. 30, 1999.

* cited by examiner

*Primary Examiner*—Don Wong
*Assistant Examiner*—Minh Dieu A
(74) *Attorney, Agent, or Firm*—Stevens, Davis, Miller & Mosher, LLP (57) ABSTRACT

A small thin integrated antenna type non-contact IC card reader/writer includes a loop antenna for supplying electric power and sending data to a non-contact IC card by electromagnetic induction and for acquiring receiving data from the non-contact IC card by a change in the load; a control portion for controlling a resonance matching circuit, wireless sending pjortion and wireless receiving portion; and a control board on which the control portion is mounted. The control board is accommodated in a shielded case, wherein the components are arranged and assembled so that a centr al axis of the loop antenna in the thickness direction and a central axis of the shielded case in the thickness direction can be made to substantially coincide with each other.

18 Claims, 11 Drawing Sheets

INTEGRATED ANTENNA TYPE NON-CONTACT IC CARD READER/WRITER

BACKGROUND OF THE INVENTION

1. Field of the Invention

The present invention relates to a neighborhood type (The correspondence distance is approximately 1 m.) non-contact IC card reader/writer by which electric power and sending data are supplied to a non-contact IC card, and receiving data is acquired from the non-contact IC card by a change in the load. That is, the present invention relates to an integrated antenna type non-contact IC card reader/writer, the size of which is reduced when the antenna and the control board are integrated into one body.

2. Description of the Related Art

Conventionally, a reader/writer system using IC cards is generally referred to as an IC card system. For example, this reader/writer system is being put into practical use for the physical distribution system, traffic system and air freight management system in which the frequency band of 13.56 MHz is used. This system includes: an IC card on which an IC chip and antenna coil are provided on one piece of card made of resin; and a reader/writer conducting correspondence with this IC card. This reader/writer is provided with a loop antenna, which constantly or intermittently sends electric power and sending data and acquires receiving data from IC card located in a range capable of receiving electric power and sending data.

Figure 5:
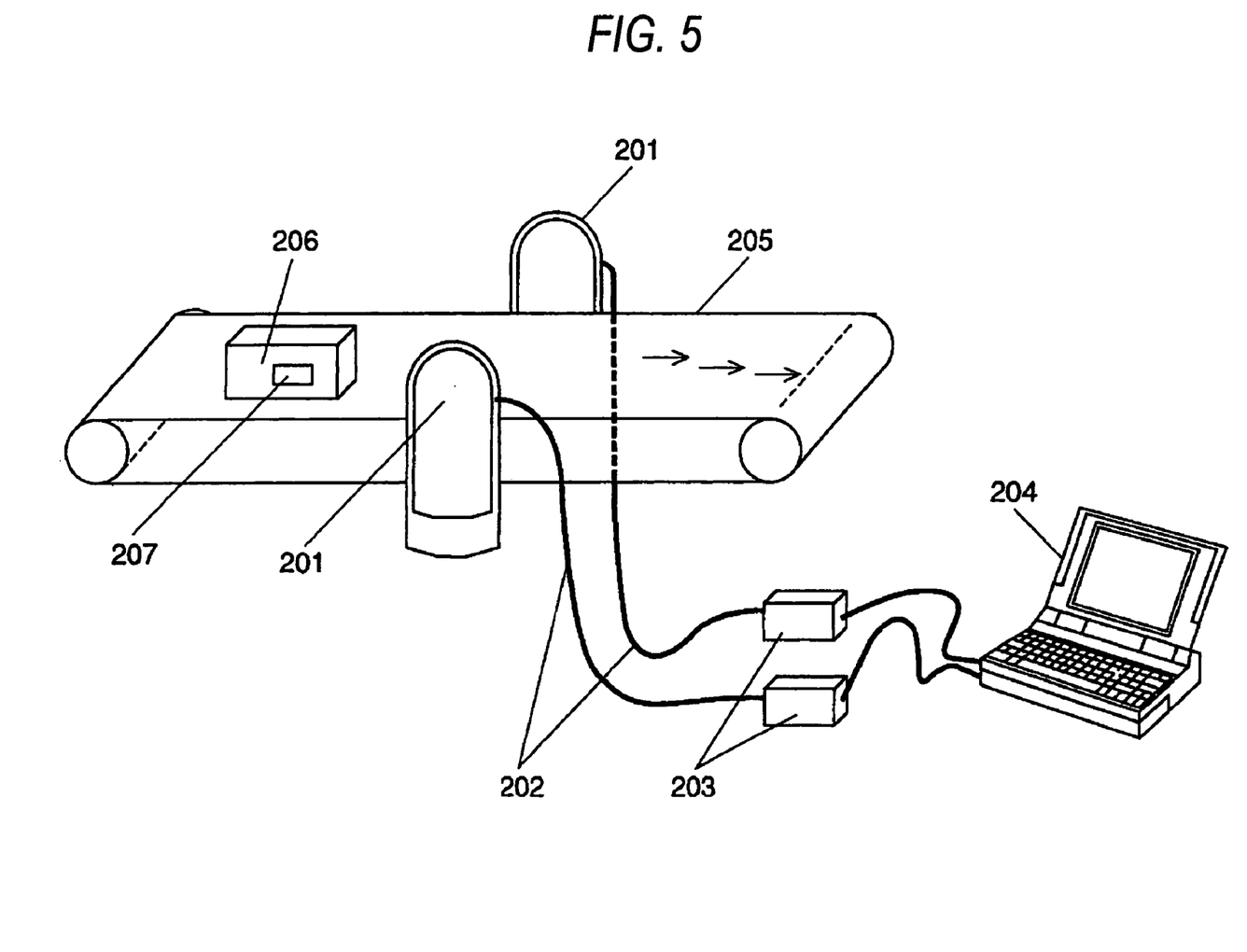
FIG. 5 is a conceptional view showing a conventional non-contact IC card reader/writer.

As an example, a conventional non-contact IC card system and loop antenna described in "Official gazette of JP-A-2002-279362" are shown in FIG. 5. In this connection, FIG. 5 is a conceptional view showing a conventional non-contact IC card reader/writer. As shown in FIG. 5, the antenna (loop antenna) 201 and reader/writer (R/W) 203 are connected with each other by the coaxial cable 202. Further, the reader/writer 203 is connected with the control unit 204. The non-contact IC card (IC tag) 207 is stuck on the load 206 conveyed on the conveyance line 205. Supplying of electric power and sending and receiving of data are conducted between this non-contact IC card 207 and the antenna 201 connected with the reader/writer 203, and assortment and management are conducted on the load 206. As shown in FIG. 5, the conventional antenna 201 and the reader/writer 203 are arranged at distant places and connected with each other by the long coaxial cable 202.

Figure 6:
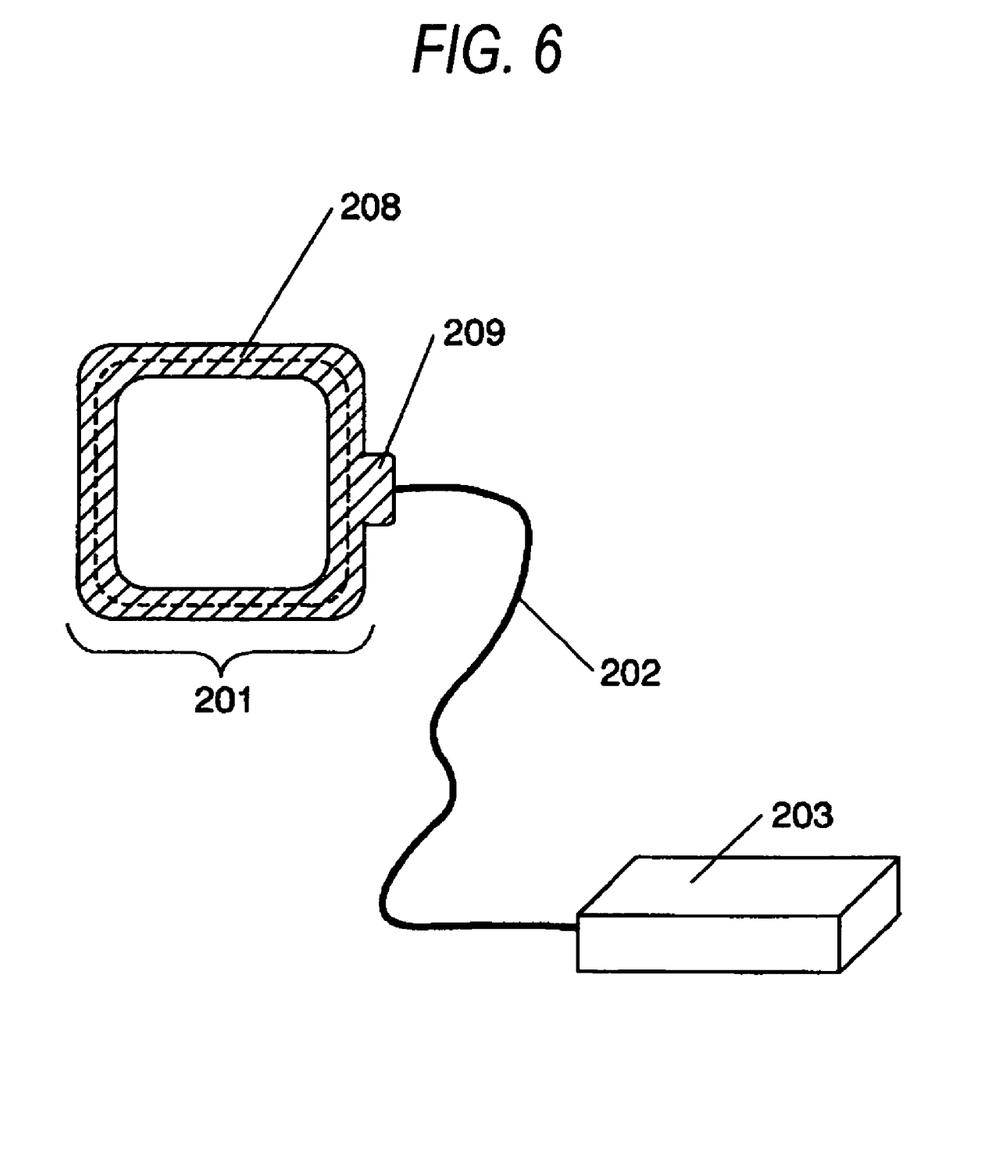
FIG. 6 is a simplified view showing a conventional non-contact IC card reader/writer.

A positional relation among the antenna 201, the long coaxial cable 202 and the reader/writer 203 is briefly shown in FIG. 6. In this connection, FIG. 6 is a simplified view showing a conventional non-contact IC card reader/writer. In FIG. 6, the conventional neighborhood type non-contact IC card reader/writer includes: an antenna portion composed of the loop antenna 208 and the antenna radome 209 made of resin for accommodating the loop antenna 208; and a reader/writer 203 for supplying electric power and sending data to the antenna portion 201 and for acquiring receiving data. The antenna portion 201 and the reader/writer 203 are connected with each other by the coaxial cable 202.

Figure 7:
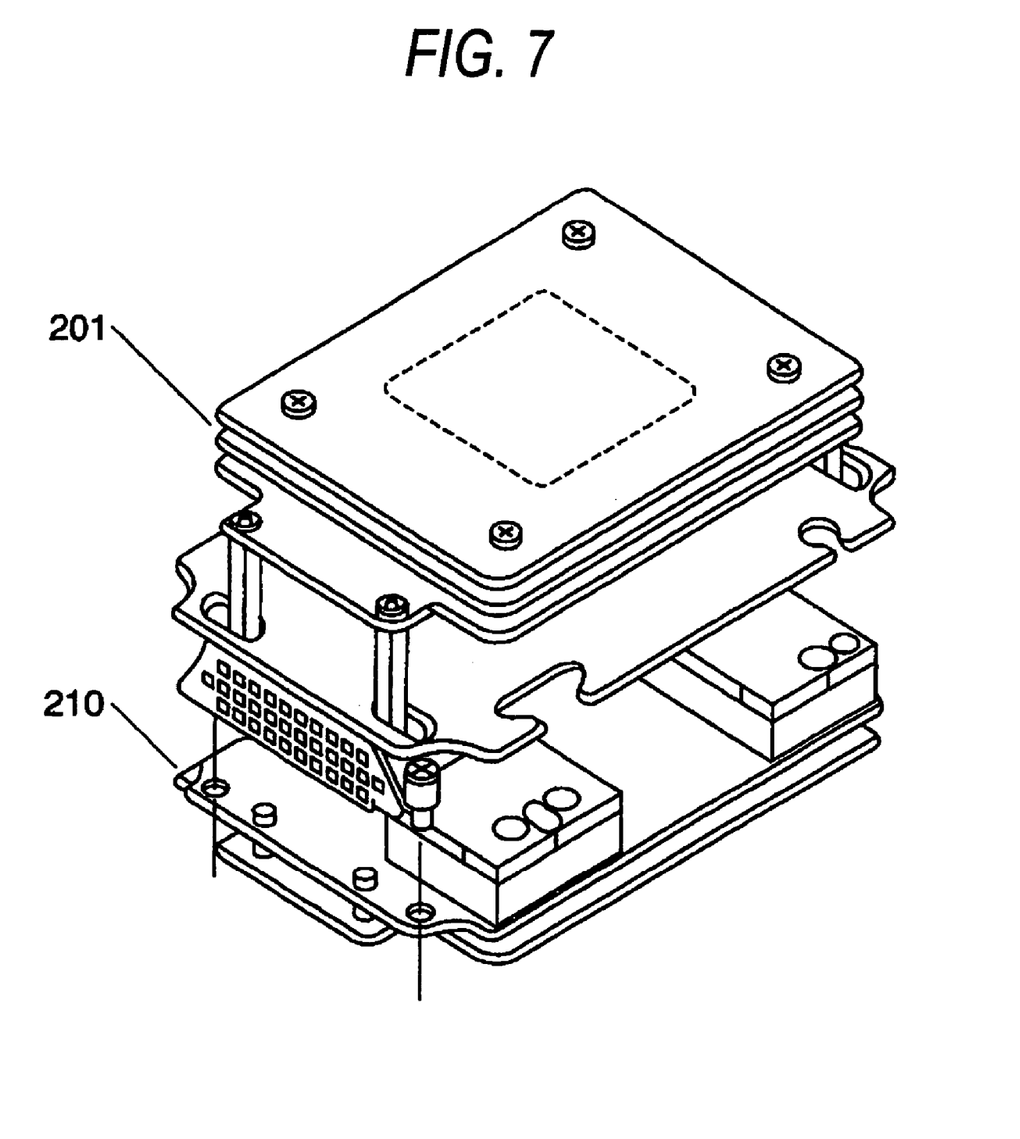
FIG. 7 is a conceptional view showing a conventional non-contact IC card reader/writer.

A conventional neighborhood type non-contact IC card reader/writer described in "Official gazette of JP-A-2002-063552" is shown in FIG. 7. In this connection, FIG. 7 is a conceptional view showing a conventional non-contact IC card reader/writer. As shown in FIG. 7, the conventional neighborhood type non-contact IC card reader/writer is assembled in such a manner that the antenna portion 201 and the control board 210 are made to come close to each other being laminated on each other. Therefore, a size of the entire device in the thickness direction is increased and an entire region on one side of the antenna opening is substantially covered with the control board 210.

As described above, in the conventional neighborhood type non-contact IC card reader/writer shown in FIGS. 5 and 6, the antenna portion 201 and the reader/writer 203 are separate from each other and connected by the coaxial cable 202. Due to this constitution, the following problems may be encountered. In the case of installing this device, when the coaxial cable 202 is laid round the device, the neighboring antenna 201 is affected by the coaxial cable 202, and the resonance frequency is shifted (transition of the resonance frequency). Accordingly, it becomes necessary to adjust the resonance frequency by a trimmer condenser (not shown) provided in the antenna resonance circuit.

Further, the following problems may be encountered. In some cases, since a place in which the device is installed is restricted, length of the coaxial cable 202 is greatly increased. Accordingly, electric power to be transmitted is lowered and further data to be received is lost by an increase in the cable transmission loss. Furthermore, since length of the coaxial cable 202 is increased, the coaxial cable 202 tends to be affected by an obstruction wave and noise given from the outside.

Furthermore, the following problems may be encountered. The conventional neighborhood type non-contact IC card reader/writer shown in FIG. 7 is assembled in such a manner that the antenna portion 201 and the control board 210 are made to come close to each other being laminated on each other. Therefore, a size of the entire device in the thickness direction is increased and an entire region on one side of the antenna opening is substantially covered with the control board 210. Accordingly, an electromagnetic field generated by the antenna is interrupted. Therefore, even when an intensity of electric power of sending is increased, the electric power to be sent into the space is lost, which decreases a distance of correspondence.

SUMMARY OF THE INVENTION

The present invention has been accomplished to solve the above problems. It is an object of the present invention to provide a small thin integrated antenna type non-contact IC card reader/writer, the characteristic of which is stable, characterized in that: the device is seldom affected by the restriction of a place in which the device is installed; the device is seldom affected even when the coaxial cable is laid round the device; and it is unnecessary to adjust the resonance frequency of the antenna, so that the device can be easily installed.

In order to solve the above conventional problems, the present invention provides an integrated antenna type non-contact IC card reader/writer comprising: a circular or substantially rectangular or polygonal loop antenna for supplying electric power and sending data to a non-contact IC card by electromagnetic induction and for acquiring receiving data from the non-contact IC card by a change in the load; a resonance matching circuit composing a resonance circuit for making the loop antenna resonate with a desired frequency and also composing a matching circuit for matching impedance with a transmission line; a wireless sending portion for supplying electric power and sending data to the loop antenna via the resonance matching circuit; a wireless receiving portion for acquiring receiving data from the loop antenna via the resonance matching circuit; and a control board on which the resonance matching circuit and a control portion for controlling the wireless sending portion and the wireless receiving portion are mounted, the control board being accommodated in a shielded case, wherein the components are arranged and assembled so that a central axis of the loop antenna in the thickness direction and a central axis of the shielded case in the thickness direction can be made to substantially coincide with each other.

Also, in order to solve the above conventional problems, the present invention provides an integrated antenna type non-contact IC card reader/writer comprising: a circular or substantially rectangular or polygonal loop antenna for supplying electric power and sending data to a non-contact IC card by electromagnetic induction and for acquiring receiving data from the non-contact IC card by a change in the load; a resonance matching circuit composing a resonance circuit for making the loop antenna resonate with a desired frequency and also composing a matching circuit for matching impedance with a transmission line; a wireless sending portion for supplying electric power and sending data to the loop antenna via the resonance matching circuit; a wireless receiving portion for acquiring receiving data from the loop antenna via the resonance matching circuit; and a control board on which the resonance matching circuit and a control portion for controlling the wireless sending portion and the wireless receiving portion are mounted, the control board being accommodated in a shielded case, wherein the loop antenna and the shielded case are arranged and assembled on the same plane being adjacent to each other.

DESCRIPTION OF THE PREFFERED EMBODIMENTS

Referring to FIGS. 1 to 4 and FIGS. 8–11, embodiments of the present invention will be explained below. In this connection, the definition of the non-contact type IC card of the present invention is not limited to a so-called card. The definition of the non-contact type IC card of the present invention includes a wireless correspondence medium capable of corresponding with a reader/writer in a state of non-contact. Depending upon the use, the non-contact type IC card of the present invention includes an IC tag, ID tag and identification label. Also, a reading/writing apparatus corresponds to an apparatus which is communicated with the above-described wireless communication media. Then, the reading/writing apparatus reads information from the wireless communication media, and writes information into the wireless communication media. It should be understood that the reading/writing apparatus performs at least any one of information reading/writing operations, depending upon use purposes.

An integrated antenna type non-contact IC card reader/writer comprises: a circular or substantially rectangular or polygonal loop antenna for supplying electric power and sending data to a non-contact IC card by electromagnetic induction and for acquiring receiving data from the non-contact IC card by a change in the load; a resonance matching circuit composing a resonance circuit for making the loop antenna resonate with a desired frequency and also composing a matching circuit for matching impedance with a transmission line; a wireless sending portion for supplying electric power and sending data to the loop antenna via the resonance matching circuit; a wireless receiving portion for acquiring receiving data from the loop antenna via the resonance matching circuit; and a control board on which the resonance matching circuit and a control portion for controlling the wireless sending portion and the wireless receiving portion are mounted, the control board being accommodated in a shielded case, wherein the components are arranged and assembled so that a central axis of the loop antenna in the thickness direction and a central axis of the shielded case in the thickness direction can be made to substantially coincide with each other. When the control board, on which the control portion for controlling the wireless sending portion and the wireless receiving portion is mounted, is accommodated in the shielded case, unnecessary electromagnetic waves can be prevented from leaking out and obstructive electromagnetic waves coming from the outside can be prevented from intruding into the device. Further, sending signals emitted from the device itself can be prevented from spreading out into the receiving circuit. When the loop antenna and the shielded case are arranged and assembled so that the central axis of the loop antenna in the thickness direction and the central axis of the shielded case in the thickness direction can substantially coincide with each other, length of the entire device in the thickness direction can be reduced, and the device can be easily transported and installed. Further, even when the coaxial cable is laid round the device in the case of installing the device, a bad influence caused by laying the coaxial cable round the device can be avoided. Accordingly, a shift (transition) of the resonance frequency caused by the coaxial cable can be avoided, and it becomes unnecessary to adjust the resonance frequency.

The integrated antenna type non-contact IC card reader/writer, wherein the loop antenna and the shielded case are arranged and assembled so that a central axis of the loop antenna in the longitudinal direction and a central axis of the shielded case in the longitudinal direction can be made to coincide with each other on an opening face of the loop antenna. The directivity of the antenna can be made to pass through the center 0 of the loop antenna in the longitudinal direction (Y-axis) and an intensity of the electromagnetic field can be maximized on axis Z-Z' perpendicular to Y-axis.

The integrated antenna type non-contact IC card reader/writer, wherein the loop antenna and the shielded case are arranged and assembled so that a central axis of the loop antenna in the lateral direction and a central axis of the shielded case in the lateral direction can be made to coincide with each other on an opening face of the loop antenna. The directivity of the antenna is made to pass through the center 0 of the loop antenna in the lateral direction (X-axis) and an intensity of the electromagnetic field can be maximized on axis Z-Z' perpendicular to X-axis.

The integrated antenna type non-contact IC card reader/writer, wherein an area ratio of the loop antenna to the shield case accommodating the control board, on which the control portion for controlling the wireless sending portion and wireless receiving portion is mounted, is substantially 1 to ¼ or less. Since an area of the antenna opening corresponding to ¾ of the entire antenna opening is open, the electromagnetic field generated by the antenna is seldom interrupted. Therefore, it becomes possible to substantially reduce the deterioration of the corresponding distance to zero.

The integrated antenna type non-contact IC card reader/writer, wherein the resonance matching circuit is arranged close to the loop antenna and connected with it, and a coaxial cable, the length of which is substantially ¼ or less of the maximum diameter of the loop antenna, is used for supplying and receiving electric power and sending and receiving data between the resonance matching circuit and the wireless sending portion and also between the resonance matching circuit and the wireless receiving portion. Since length of the coaxial cable is determined to be about ¼ or less of the maximum diameter of the loop antenna, the degree of freedom can be increased in the process of manufacturing the device. Accordingly, assembling can be more easily performed, and electric length of the coaxial cable can be shortened. Therefore, the cable transmission loss caused by laying the coaxial cable round the device can be reduced.

The integrated antenna type non-contact IC card reader/writer, wherein the loop antenna is directly connected with a micro strip line transmission line, which extends from the resonance matching circuit provided on the control board, for supplying and receiving electric power and sending and receiving data between the loop antenna and the wireless sending portion and also between the loop antenna and the wireless receiving portion. Since the coaxial cable is avoided in this structure, a bad influence caused by laying the coaxial cable round the device and a cable transmission loss can be avoided, and further an assembling process can be reduced in the case of manufacturing the device.

The integrated antenna type non-contact IC card reader/writer, wherein the loop antenna and shielded case are accommodated in one case made of resin. Since the device is accommodated in one case made of resin, installation can be more easily performed.

An integrated antenna type non-contact IC card reader/writer comprising: a loop antenna for corresponding with a wireless correspondence medium such as a non-contact IC card; and a control board on which a correspondence control means for corresponding between the wireless correspondence medium and the loop antenna is mounted, wherein the control board on which the correspondence control means is mounted is arranged in an opening of the loop antenna. Therefore, the device itself can be reduced in size.

The integrated antenna type non-contact IC card reader/writer, wherein the control board, on which the correspondence control means is mounted, is accommodated in a shielded case. Unnecessary electromagnetic waves can be prevented from leaking out and obstructive electromagnetic waves coming from the outside can be prevented from intruding into the device. Further, sending signals emitted from the device itself can be prevented from spreading out into the receiving circuit.

The an integrated antenna type non-contract IC card reader/writer, wherein the loop antenna and the control board, on which and the correspondence control means is mounted, are accommodated in one housing. Therefore, the installation of the device can be more easily performed.

As described above, the present invention can provide a small thin integrated antenna type non-contact IC card reader/writer characterized in that: the device is seldom affected by the restriction of a place in which the device is installed; and it is unnecessary to adjust the resonance frequency of the antenna, so that the device can be easily installed.

An integrated antenna type non-contact IC card reader/writer comprises: a circular or substantially rectangular or polygonal loop antenna for supplying electric power and sending data to a non-contact IC card by electromagnetic induction and for acquiring receiving data from the non-contact IC card by a change in the load; a resonance matching circuit composing a resonance circuit for making the loop antenna resonate with a desired frequency and also composing a matching circuit for matching impedance with a transmission line; a wireless sending portion for supplying electric power and sending data to the loop antenna via the resonance matching circuit; a wireless receiving portion for acquiring receiving data from the loop antenna via the resonance matching circuit; and a control board on which the resonance matching circuit and a control portion for controlling the wireless sending portion and the wireless receiving portion are mounted, the control board being accommodated in a shielded case, wherein the loop antenna and the shielded case are arranged and assembled on the same plane being adjacent to each other. When the resonance matching circuit and the control board, on which the control portion for controlling the wireless sending portion and the wireless receiving portion is mounted, are accommodated in the shielded case, unnecessary electromagnetic waves can be prevented from leaking out and obstructive electromagnetic waves coming from the outside can be prevented from intruding into the device. Further, it is possible to prevent the sending signal, which is emitted by the device itself, from coming into the receiving circuit. When the loop antenna and the shielded case are arranged and assembled on the same plane being adjacent to each other, a bad influence caused by laying the coaxial cable at the time of installing can be avoided, and a shift (transition) of the resonance frequency caused by the influence of the coaxial cable can be avoided. Therefore, it becomes unnecessary to adjust the resonance frequency.

The integrated antenna type non-contact IC card reader/writer, wherein the resonance matching circuit is arranged close to the loop antenna and connected with it, and a coaxial cable, the length of which is substantially ¼ or less of the maximum diameter of the loop antenna, is used for supplying and receiving electric power and sending and receiving data between the resonance matching circuit and the wireless sending portion and also between the resonance matching circuit and the wireless receiving portion. Since length of the coaxial cable is determined to be about ¼ or less of the maximum diameter of the loop antenna, the degree of freedom can be increased in the process of manufacturing the device. Accordingly, assembling can be more easily performed, and electric length of the coaxial cable can be shortened. Therefore, the cable transmission loss caused by laying the coaxial cable round the device can be reduced.

The integrated antenna type non-contact IC card reader/writer, wherein the loop antenna is directly connected with a micro strip line transmission line, which extends from the resonance matching circuit provided on the control board, for supplying and receiving electric power and sending and receiving data between the loop antenna and the wireless sending portion and also between the loop antenna and the wireless receiving portion. Since the coaxial cable is avoided in this structure, a bad influence caused by laying the coaxial cable round the device and a cable transmission loss can be avoided, and further an assembling process can be reduced in the process of manufacturing the device.

The integrated antenna type non-contact IC card reader/writer, wherein the loop antenna and shielded case are accommodated in one case made of resin. Since the device is accommodated in one case made of resin, installation can be more easily performed.

An integrated antenna type non-contact IC card reader/writer comprising: a loop antenna for corresponding with a wireless correspondence medium such as a non-contact IC card; and a control board on which a correspondence control means for corresponding between the wireless correspondence medium and the loop antenna is mounted, wherein the loop antenna and the control board, on which the correspondence control means is mounted, are arranged on the same plane being adjacent to each other. A bad influence caused by laying the coaxial cable round the device at the time of installing can be avoided, and a shift (transition) of the resonance frequency caused by the influence of the coaxial cable can be avoided. Therefore, it becomes unnecessary to adjust the resonance frequency.

The integrated antenna type non-contact IC card reader/writer, wherein the control board, on which the correspondence control means is mounted, is accommodated in a shielded case. Unnecessary electromagnetic waves can be prevented from leaking out and obstructive electromagnetic waves coming from the outside can be prevented from intruding into the device. Further, sending signals emitted from the device itself can be prevented from spreading out into the receiving circuit.

The integrated antenna type non-contact IC card reader/writer, wherein the control board, on which the loop antenna and the correspondence control means are mounted, is accommodated in one housing. Therefore, the installation of the device can be more easily performed.

As described above, the present invention can provide a small thin integrated antenna type non-contact IC card reader/writer characterized in that: the device is seldom affected by the restriction of a place in which the device is installed; and it is unnecessary to adjust the resonance frequency of the antenna, so that the device can be easily installed.

Embodiment 1

Figure 1:
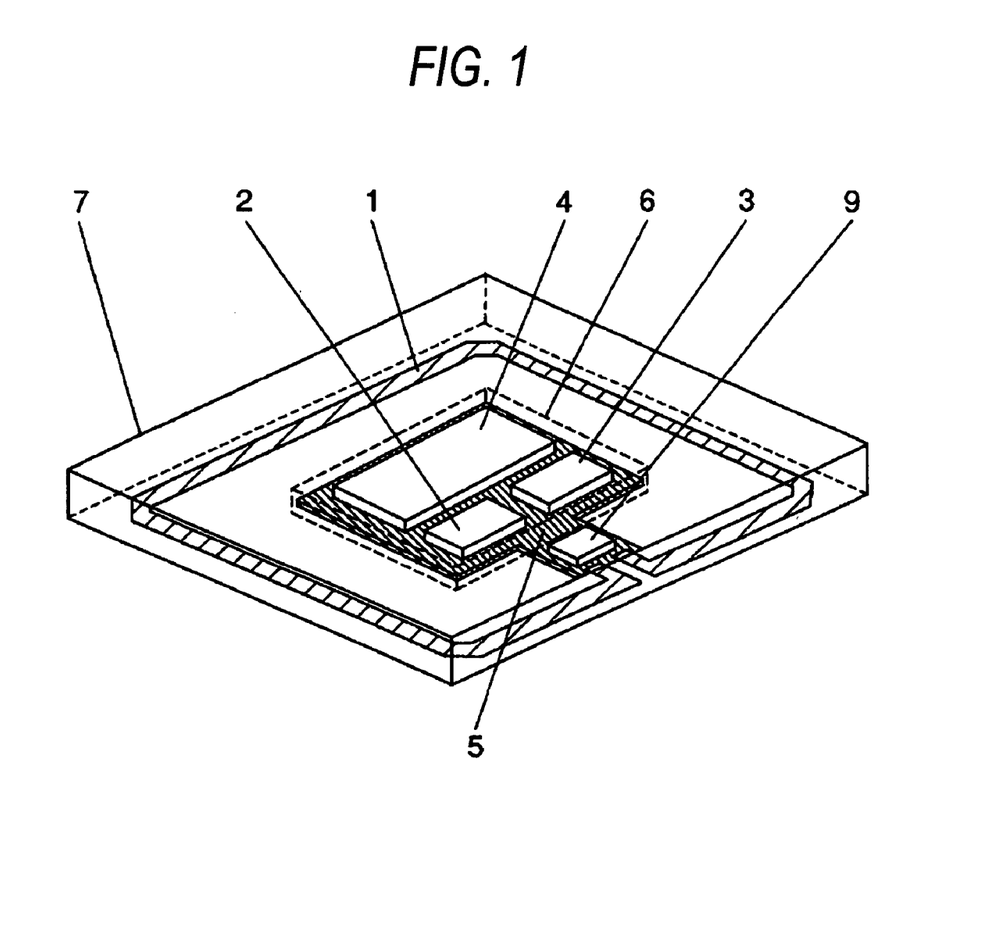
FIG. 1 is a perspective see-through view showing an integrated antenna type non-contact IC card reader/writer of Embodiment 1 of the present invention.
Figure 2:
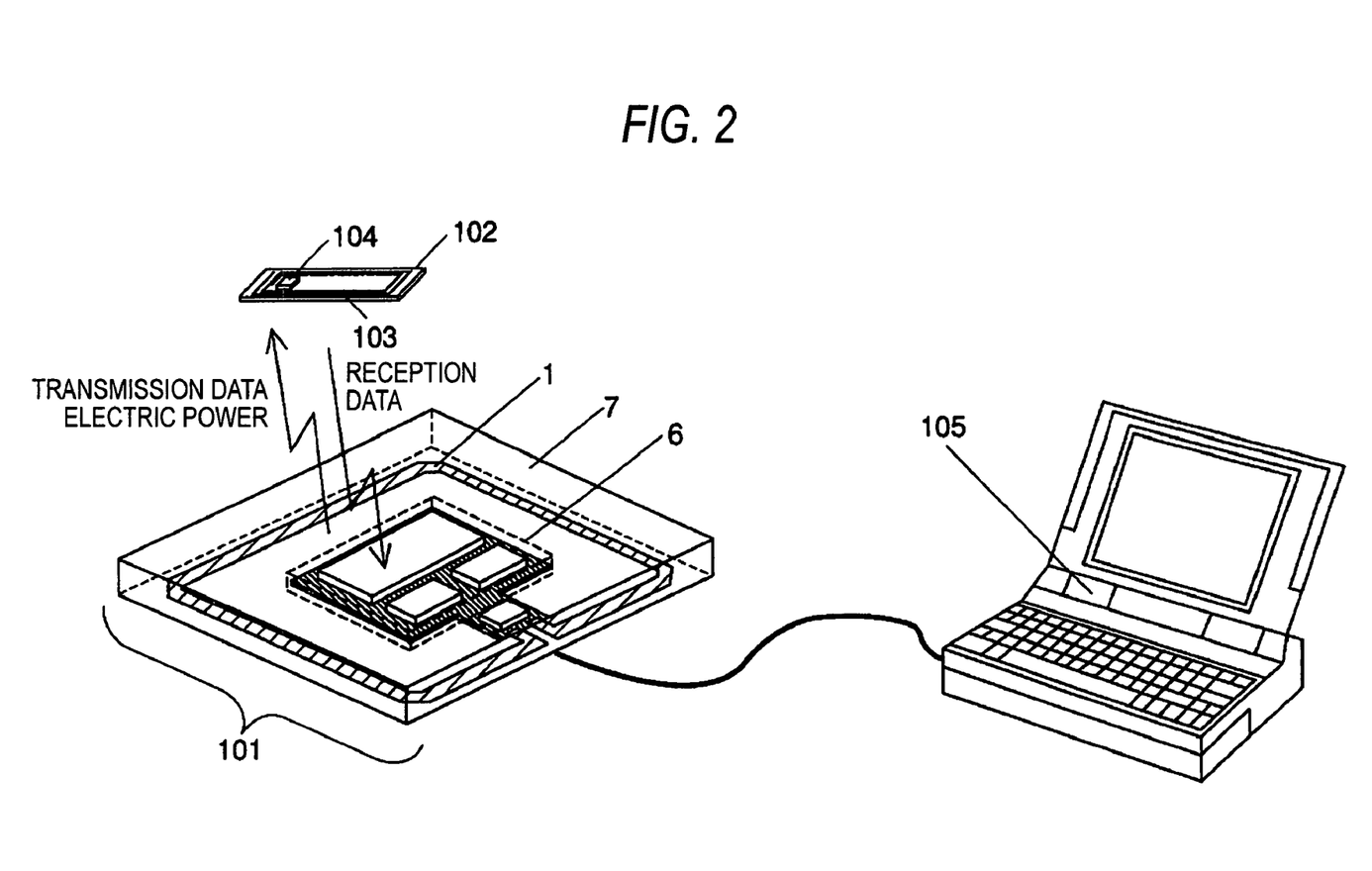
FIG. 2 is a view for explaining operation of the integrated antenna type non-contact IC card system of Embodiment 1 of the present invention.

FIG. 1 is a perspective see-through view showing an integrated antenna type non-contact IC card reader/writer of Embodiment 1 of the present invention, and FIG. 2 is a view for explaining operation of the integrated antenna type non-contact IC card system in Embodiment 1 of the present invention. In FIGS. 1 and 2, reference numeral 1 is a loop antenna, which supplies electric power and sending data to non-contact IC card 102 described later and acquires receiving data from non-contact IC card 102 by a change in the load. Concerning the profile of the antenna 1, it is circular, substantially rectangular or polygonally loop-shaped. Reference numeral 2 is a wireless sending portion for supplying electric power and sending data to the loop antenna 1, reference numeral 3 is a wireless receiving portion for acquiring receiving data from the loop antenna 1, reference numeral 4 is a control portion for controlling the wireless sending portion 2 and the wireless receiving portion 3, reference numeral 5 is a control board on which the wireless sending portion 2, the wireless receiving portion 3 and the control portion 4 are mounted, and reference numeral 6 is a shielded case in which the wireless sending portion 2, the wireless receiving portion 3, the control portion 4 and the control board 5 are accommodated. Reference numeral 7 is a case made of resin in which the loop antenna 1, the wireless sending portion 2, the wireless receiving portion 3, the control portion 4, the control board 5 and the shielded case 6 are accommodated, and reference numeral 9 is a resonance matching circuit. In this connection, in FIGS. 1 and 2, in order to make the inside of the case 7 clear, the case 7 is illustrated in a see-through state, and the shielded case 6 and the non-contact IC card 102 are also illustrated in a see-through state.

Next, explanations will be made into the corresponding operation in which the above integrated antenna type non-contact IC card reader/writer is used. In FIG. 2, reference numeral 101 is an integrated antenna type non-contact IC card reader/writer, which will be referred to as a reader/writer hereinafter, reference numeral 102 is a non-contact IC card, reference numeral 103 is an antenna coil of the non-contact IC card, and reference numeral 104 is an IC mounted on the non-contact IC card. Further, reference numeral 105 is a control terminal connected with the reader/writer 101.

First, in the case where only electric power is supplied from the integrated antenna type non-contact IC card reader/writer 101 to the non-contact IC card 102 (standby mode), in FIG. 2, in the integrated antenna type non-contact IC card reader/writer 101, a high frequency signal of a constant amplitude is supplied from the oscillating circuit (not shown) to the wireless sending portion 2 and amplified and then sent to the loop antenna 1 via the feeding line. On the non-contact IC card 102, the high frequency signal is supplied to IC-104 via the antenna coil 103 which is electromagnetically connected with the loop antenna 1 of the integrated antenna type non-contact IC card reader/writer 101. This high frequency signal is rectified by the rectifying circuit (not shown) provided in IC 104, and a necessary, predetermined electric power source voltage is generated in each portion of the non-contact IC card 102.

Next, explanations will be made into a case in which data is sent from the integrated antenna type non-contact IC card reader/writer 101 to the IC card 102 (sending mode). In FIGS. 1 and 2, in the integrated antenna type non-contact IC card reader/writer 101, data is sent from the control terminal 105 to the wireless sending portion 2 via the control portion 4. In the same manner as that of the standby mode described before, this wireless sending portion 2 is supplied with a high frequency signal of a constant amplitude, and this high frequency signal is modulated by the data, so that a modulated high frequency signal is outputted. This modulated high frequency signal is sent to the loop antenna 1 via the feeder line. In the non-contact IC card 102, the high frequency signal is supplied to IC 104 via the antenna coil 103 which is electromagnetically connected with the loop antenna 1 of the integrated antenna type non-contact IC card reader/writer 101. In the same manner as that of the standby mode described before, this high frequency signal is rectified by the rectifying circuit, and a necessary, predetermined electric power source voltage is generated in each portion of the non-contact IC card 102. The output signal of the antenna coil 103 is supplied to the receiving circuit (not shown) in IC 104, and data is demodulated in this portion and written in the memory (not shown).

Finally, explanations will be made into a case in which the integrated antenna type non-contact IC card reader/writer 101 receives data from the non-contact IC card 102 (receiving mode). In the same manner as that of the standby mode described above, a high frequency signal of a constant amplitude, which is not modulated, is outputted from the wireless sending portion 2 of the integrated antenna type non-contact IC card reader/writer 101. This high frequency signal is sent to the non-contact card 102 via the loop antenna 1 and the antenna coil 103, and a necessary predetermined electric power source voltage is generated in each portion of the non-contact card 102 in the same manner as that of the standby mode described before. On the other hand, on the non-contact IC card 102, according to the data which has been read out from the memory (not shown), for example, there are provided a load resistance (not shown) connected with the antenna coil 103 and a switch (not shown) and the switch is turned on and off according to "1", "0" bit of the data. When the switch is turned on and off as described above, in the reader/writer 101, a load given to the antenna coil 103 changes, and impedance on the antenna 1 side changes by the electromagnetic induction. As a result, an amplitude of the high frequency current changes. That is, this high frequency current is subjected to amplitude-modulation by the data of the non-contact IC card 102. This modulated high frequency signal is demodulated by the wireless receiving portion 3 and data can be obtained. This data is processed by the control portion 4 and sent to the control terminal 105 and others.

As described above, the high frequency signal of a constant amplitude supplied from the oscillating circuit is amplified by the wireless sending portion 2. In this case, it is preferable to use an E-class amplifier for this amplification. When the E-class amplifier is used, an high efficiency operation can be realized. Due to the foregoing, even when a sending output is increased, a quantity of heat generated can be suppressed.

Embodiment 2

Figure 3:
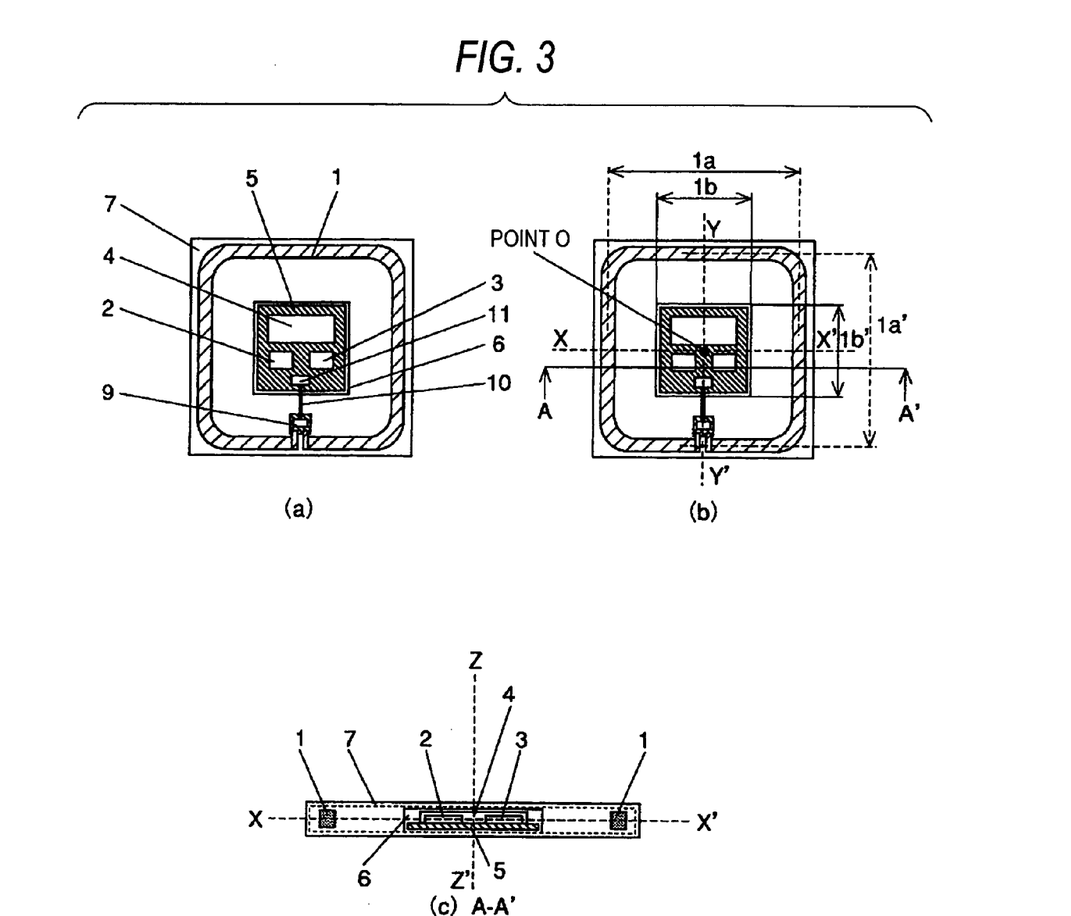
FIG. 3(a) is a plan view showing an integrated antenna type non-contact IC card reader/writer of Embodiment 2 of the present invention.
FIG. 3(b) is a plan view showing an integrated antenna type non-contact IC card reader/writer of Embodiment 2 of the present invention.
FIG. 3(c) is a partially sectional view showing an integrated antenna type non-contact IC card reader/writer of Embodiment 2 of the present invention.

FIGS. 3(*a*) and 3(*b*) are plan views showing an integrated antenna type non-contact IC card reader/writer of Embodiment 2 of the present invention FIG. 3(*c*) is a partially sectional view showing an integrated antenna type non-contact IC card reader/writer of Embodiment 2 of the present invention. In this connection, in FIG. 3, the case 7 and the shielded case 6 are shown in a see-through state.

In FIG. 3(*a*), the wireless sending portion 2, the wireless receiving portion 3, the control portion 4 and the control board 5 on which the distributing and synthesizing circuit 11 are mounted are arranged on the opening face of the loop antenna 1, and these components are accommodated in the shielded case 6.

In the view, the resonance matching circuit 9 is arranged close to the electric feeding point of the loop antenna 1 and connected with the loop antenna 1. An output of the resonance matching circuit 9 is connected to the distributing and synthesizing circuit 11 accommodated in the shielded case 6 described before by the coaxial cable 10. In the partially sectional view of FIG. 3(*c*), the device is assembled in such a manner that axis X-X' passing through the center of the loop antenna 1 in the thickness direction (Z-axis) and axis X-X' passing through the center of the shielded case in the thickness direction. (Z-axis) are made to substantially coincide with each other on the opening face of the loop antenna 1. Due to the foregoing, length of the entire device in the thickness direction (direction of Z-Z' axis) can be reduced. Therefore, transportation and installation can be easily performed in this non-contact IC card reader/writer.

In FIG. 3(*b*), when the device is assembled in such a manner that axis X-X' passing through the center 0 of the loop antenna 1 in the longitudinal direction (Y-axis) and axis X-X' passing through the center 0 of the shielded case in the longitudinal direction (Y-axis) are made to substantially coincide with each other. In this way, the directivity of the antenna can be made to pass through the center 0 of the loop antenna 1 in the longitudinal direction (Y-axis) and an intensity of the electromagnetic field can be maximized on axis Z-Z' perpendicular to Y-axis.

Further, in FIG. 3(*b*), when the device is assembled in such a manner that axis Y-Y' passing through the center 0 of the loop antenna 1 in the width direction (X-axis) and axis Y-Y' passing through the center 0 of the shielded case 6 in the width direction (X-axis) are made to substantially coincide with each other. In this way, the directivity of the antenna can be made to pass through the center 0 of the loop antenna 1 in the width direction (X-axis) and an intensity of the electromagnetic field can be maximized on axis Z-Z' perpendicular to X-axis.

When a relation between the maximum size 1*a*, 1*a*' of the loop antenna 1, and the maximum size 1*b*, 1*b*' of the shielded case 6 in which the control board, on which the control portion for controlling the wireless sending portion and the wireless receiving portion is mounted, is substantially set at $1a \geq 2 \times 1b$, $1a' \geq 2 \times 1b'$, a ratio of the antenna opening area to the shield case 6 area substantially becomes 1 to ¼ or less. Therefore, about ¾ or more of the antenna opening area is open. Due to the above structure, an electromagnetic field generated by the antenna is seldom interrupted by the shielded case 6. Since it is possible to increase a distance $(1a-1b)/2$, $(1a'-1b')/2$ from the antenna element neighborhood, the electromagnetic field intensity level of which is high, to the shielded case 6, deterioration of the corresponding distance can be substantially made to be zero.

In FIGS. 3(*a*) and 3(*b*), the wireless sending portion 2 and the wireless receiving portion 3 are connected with the resonance matching circuit 9, which is arranged close to the loop antenna 1, via the distributing synthesizing circuit 11 by the coaxial cable 10. Since the length of the coaxial cable 10 is determined to be approximately ¼ or less of the maximum diameter of the loop antenna 1, the degree of freedom can be increased in the manufacturing and assembling process, so that the assembling work can be easily performed. Further, the electric length is so small that an influence caused by laying the coaxial cable 10 round the device can be reduced and the cable transmission loss can be also reduced.

Embodiment 3

Figure 4:
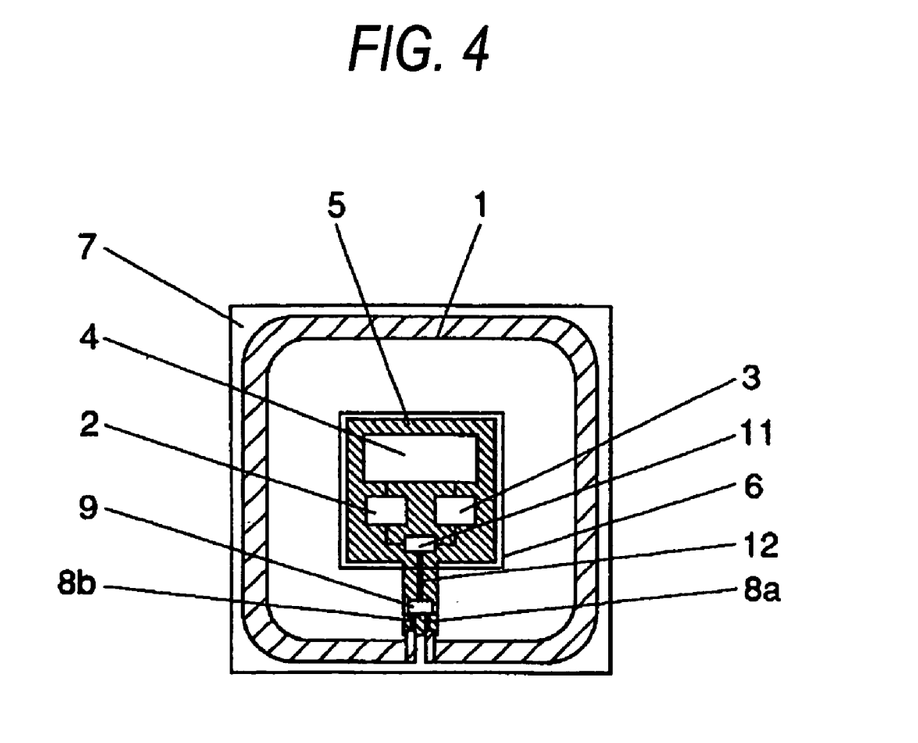
FIG. 4 is a plan view showing an integrated antenna type non-contact IC card reader/writer of Embodiment 3 of the present invention.

FIG. 4 is a plan view showing an integrated antenna type non-contact IC card reader/writer of Embodiment 3 of the present invention. In the view, the wireless sending portion 2 and the wireless receiving portion 3 are connected with the loop antenna 1 via the distributing synthesizing circuit 11 and also via the micro strip line transmission line 12, the resonance matching circuit 9 and the micro strip line transmission lines 8a, 8b which are arranged on the control board 5. In this structure, the coaxial cable is avoided. Therefore, an influence caused by laying the coaxial cable round the device can be reduced, and further the cable transmission loss can be avoided. Furthermore, the assembling process can be reduced when the device is manufactured, so that the manufacturing cost can be decreased.

Embodiment 4

Figure 8:
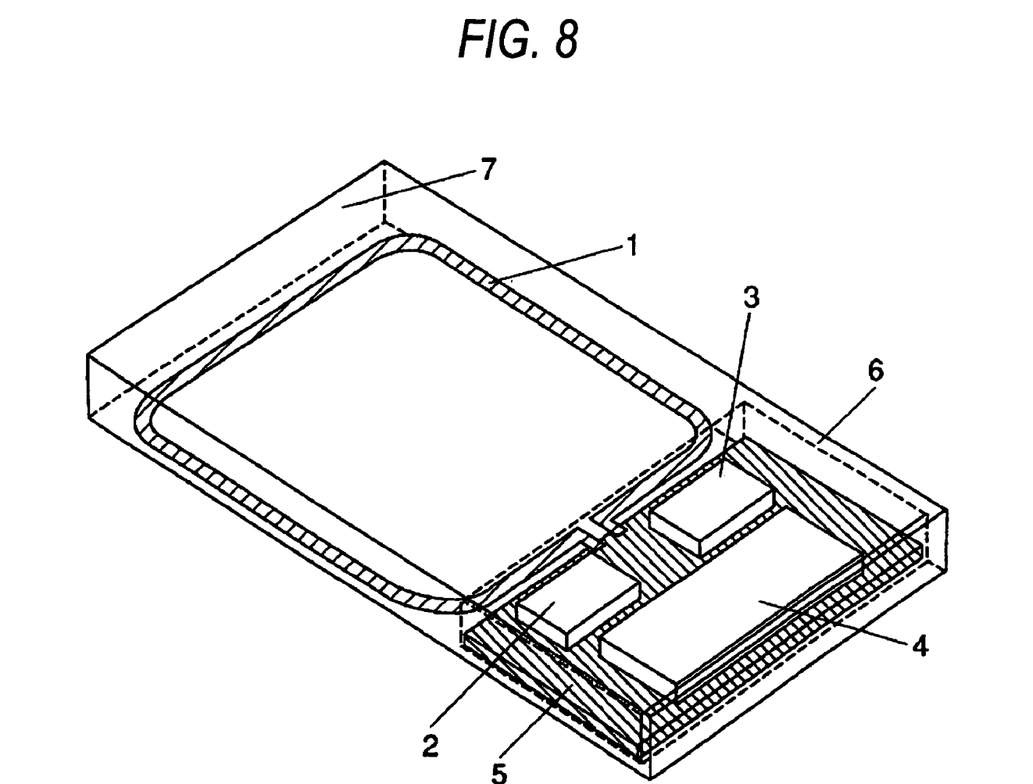
FIG. 8 is a perspective see-through view showing an integrated antenna type non-contact IC card reader/writer of Embodiment 1 of the present invention.
Figure 9:
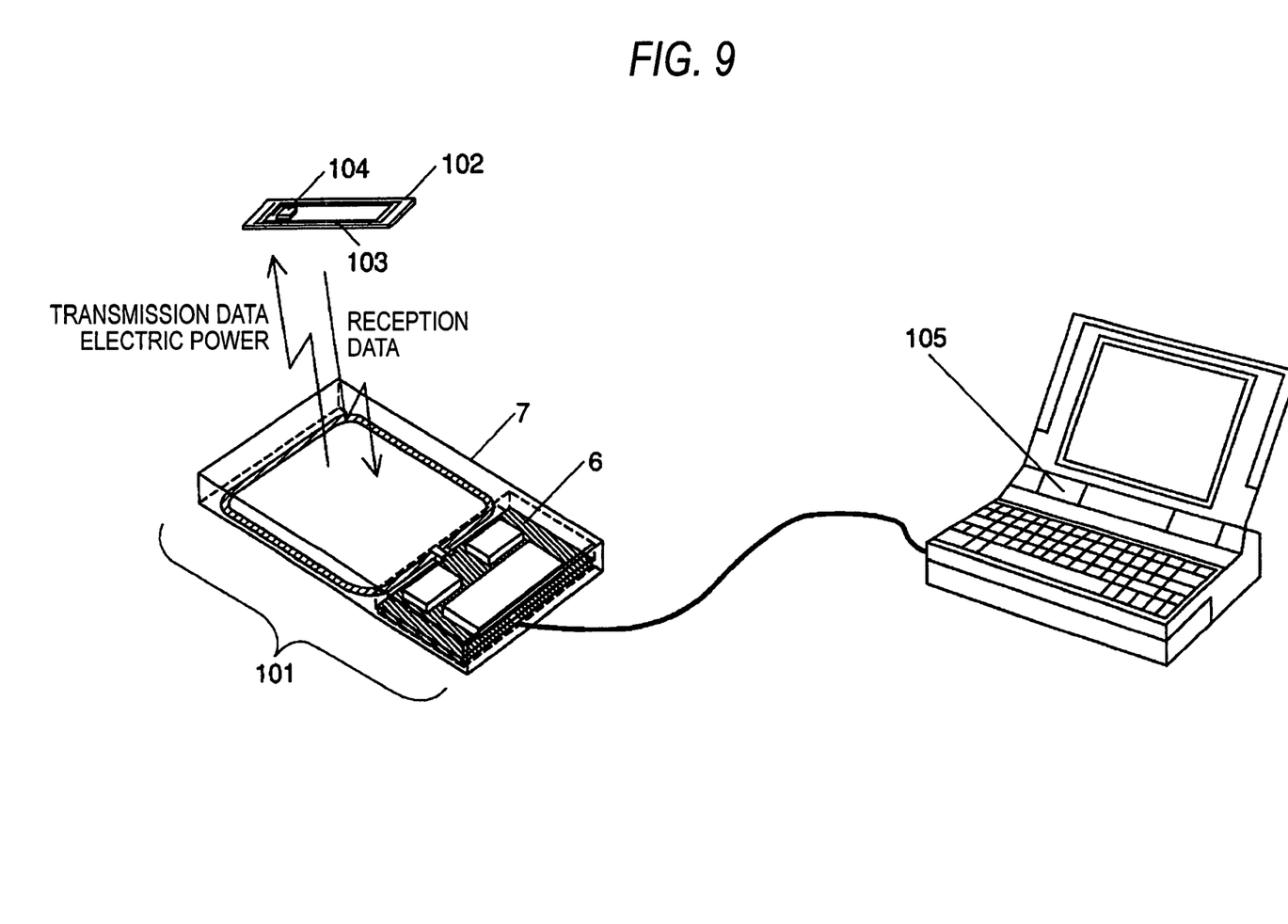
FIG. 9 is a view for explaining operation of the integrated antenna type non-contact IC card system of Embodiment 1 of the present invention.

FIG. 8 is a perspective see-through view showing an integrated antenna type non-contact IC card reader/writer of Embodiment 4 of the present invention, and FIG. 9 is a view for explaining operation of the integrated antenna type non-contact IC card system in Embodiment 4 of the present invention.

In FIGS. 8 and 9, reference numeral 1 is a loop antenna, which supplies electric power and sending data to non-contact IC card 102 described later and acquires receiving data from non-contact IC card 102 by a change in the load. Concerning the profile of the antenna 1, it is circular, substantially rectangular or polygonally loop-shaped. Reference numeral 2 is a wireless sending portion for supplying electric power and sending data to the loop antenna 1, reference numeral 3 is a wireless receiving portion for acquiring receiving data from the loop antenna 1, reference numeral 4 is a control portion for controlling the wireless sending portion 2 and the wireless receiving portion 3, reference numeral 5 is a control board on which the wireless sending portion 2, the wireless receiving portion 3 and the control portion 4 are mounted, and reference numeral 6 is a shielded case in which the wireless sending portion 2, the wireless receiving portion 3, the control portion 4 and the control board 5 are accommodated. Reference numeral 7 is a case made of resin in which the loop antenna 1, the wireless sending portion 2, the wireless receiving portion 3, the control portion 4, the control board 5 and the shielded case 6 are accommodated, and reference numeral 9 is a resonance matching circuit. In this connection, in FIGS. 1 and 2, in order to make the inside of the case 7 clear, the case 7 is illustrated in the see-through state, and the shielded case 6 is also illustrated in the see-through state.

Next, explanations will be made into the corresponding operation in which the above integrated antenna type non-contact IC card reader/writer is used. In FIG. 9, reference numeral 101 is an integrated antenna type non-contact IC card reader/writer, which will be referred to as a reader/writer hereinafter, reference numeral 102 is a non-contact IC card, reference numeral 103 is an antenna coil of the non-contact IC card, and reference numeral 104 is an IC mounted on the non-contact IC card. Further, reference numeral 105 is a control terminal connected with the reader/writer 101.

First, in the case where only electric power is supplied from the integrated antenna type non-contact IC card reader/writer 101 to the non-contact IC card 102 (standby mode), in FIG. 2, in the integrated antenna type non-contact IC card reader/writer 101, a high frequency signal of a constant amplitude is supplied from the oscillating circuit (not shown) to the wireless sending portion 2 and amplified and then sent to the loop antenna 1 via the feeding line. On the non-contact IC card 102, the high frequency signal is supplied to IC 104 via the antenna coil 103 which is electromagnetically connected with the loop antenna 1 of the integrated antenna type non-contact IC card reader/writer 101. This high frequency signal is rectified by the rectifying circuit (not shown) provided in IC 104, and a necessary, predetermined electric power source voltage is generated in each portion of the non-contact IC card 102.

Next, explanations will be made into a case in which data is sent from the integrated antenna type non-contact IC card reader/writer 101 to the IC card 102 (sending mode). In FIGS. 8 and 9, in the integrated antenna type non-contact IC card reader/writer 101, data is sent from the control terminal 105 to the wireless sending portion 2 via the control portion 4. In the same manner as that of the standby mode described before, this wireless sending portion 2 is supplied with a high frequency signal of a constant amplitude, and this high frequency signal is modulated by the data, so that a modulated high frequency signal is outputted. This modulated high frequency signal is sent to the loop antenna 1 via the feeder line. In the non-contact IC card 102, the high frequency signal is supplied to IC 104 via the antenna coil 103 which is electromagnetically connected with the loop antenna 1 of the integrated antenna type non-contact IC card reader/writer 101. In the same manner as that of the standby mode described before, this high frequency signal is rectified by the rectifying circuit, and a necessary, predetermined electric power source voltage is generated in each portion of the non-contact IC card 102. The output signal of the antenna coil 103 is supplied to the receiving circuit (not shown) in IC 104, and data is demodulated in this portion and written in the memory (not shown).

Finally, explanations will be made into a case in which the integrated antenna type non-contact IC card reader/writer 101 receives data from the non-contact IC card 102 (receiving mode). In the same manner as that of the standby mode described above, a high frequency signal of a constant amplitude, which is not modulated, is outputted from the wireless sending portion 2 of the integrated antenna type non-contact IC card reader/writer 101. This high frequency signal is sent to the non-contact card 102 via the loop antenna 1 and the antenna coil 103, and a necessary predetermined electric power source voltage is generated in each portion of the non-contact card 102 in the same manner as that of the standby mode described before. On the other hand, on the non-contact IC card 102, according to the data which has been read out from the memory (not shown), for example, there are provided a load resistance (not shown) connected with the antenna coil 103 and a switch (not shown), and the switch is turned on and off according to "1", "0" bit of the data. When the switch is turned on and off as described above, in the reader/writer 101, a load given to the antenna coil 103 changes, and impedance on the antenna 1 side changes by the electromagnetic induction. As a result, an amplitude of the high frequency current changes. That is, this high frequency current is subjected to amplitude-modulation by the data of the non-contact IC card 102. This modulated high frequency signal is demodulated by the wireless receiving portion 3 and data can be obtained. This data is processed by the control portion 4 and sent to the control terminal 105 and others.

As described above, the high frequency signal of a constant amplitude supplied from the oscillating circuit is amplified by the wireless sending portion 2. In this case, it is preferable to use an E-class amplifier for this amplification. When the E-class amplifier is used, an high efficiency operation can be realized. Due to the foregoing, even when a sending output is increased, a quantity of heat generated can be suppressed.

Embodiment 2

Figure 10:
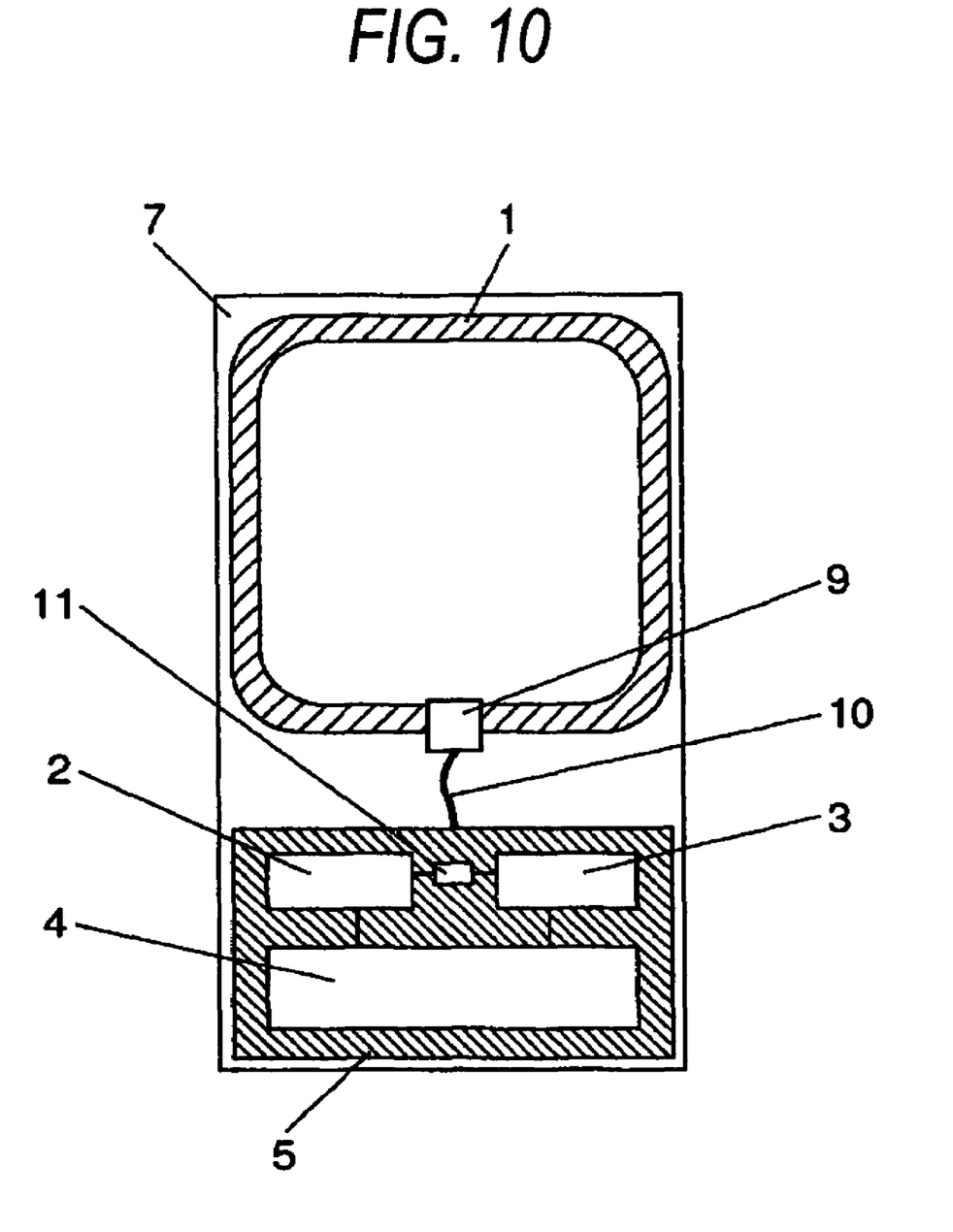
FIG. 10 is a plan view showing an integrated antenna type non-contact IC card reader/writer of Embodiment 2 of the present invention.

FIG. 10 is a plan view showing an integrated antenna type non-contact IC card reader/writer in Embodiment 5 of the present invention. In order to make the inside of the case 7 clear, the case 7 is shown in the see-through state in FIG. 3.

As shown in FIG. 10, the wireless sending portion 2 and the wireless receiving portion 3 are connected with the resonance matching circuit 9, which is arranged close to the loop antenna 1, by the coaxial cable 10 via the distributing and synthesizing circuit 11. Since the length of the coaxial cable 10 is determined to be approximately ¼ or less of the maximum diameter of the loop antenna 1, the degree of freedom can be increased in the manufacturing and assembling process, so that the assembling work can be easily performed. Further, the electric length is so small that an influence caused by laying the coaxial cable 10 round the device can be reduced and the cable transmission loss can be also reduced. In this connection, in the same manner as that of Embodiment 4, the shielded case 6 for accommodating the control board 5, on which the wireless sending portion 2, the wireless receiving portion 3 and the control portion 4 are mounted, may be provided in this Embodiment 5.

Embodiment

Figure 11:
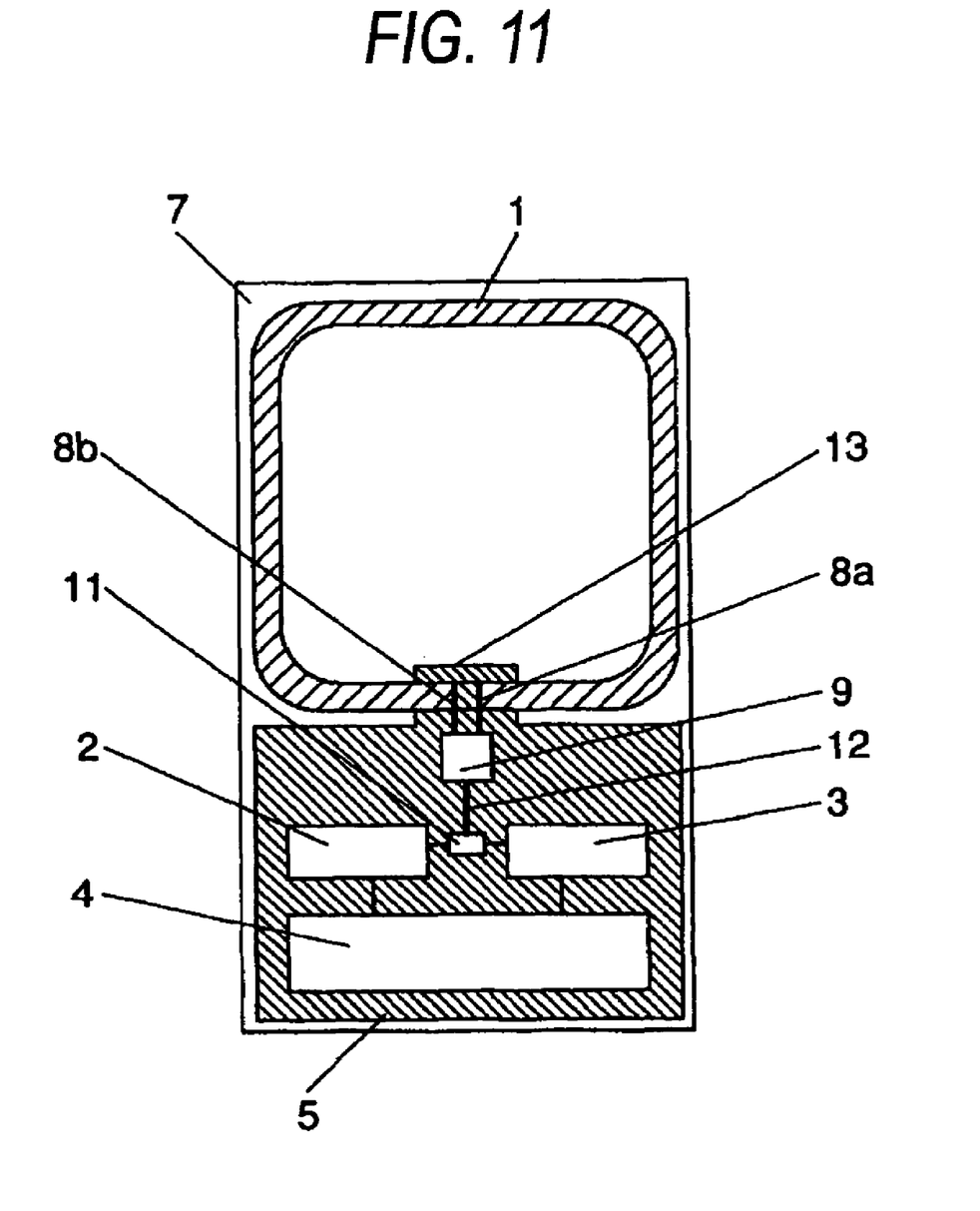
FIG. 11 is a plan view showing an integrated antenna type non-contact IC card reader/writer of Embodiment 3 of the present invention.

FIG. 11 is a plan view showing an integrated antenna type non-contact IC card reader/writer in Embodiment 6 of the present invention. In order to make the inside of the case 7 clear, the case 7 is shown in the see-through state in FIG. 4.

As shown in FIG. 11, the wireless sending portion 2 and the wireless receiving portion 3 are connected with the loop antenna 1 via the distributing and synthesizing circuit 11 and also via the micro strip line transmission line 12, the resonance matching circuit 9 and the micro strip line transmission lines 8a, 8b which are provided on the control board 5. In Embodiment 6, since the coaxial cable is avoided in this structure, a bad influence caused by laying the coaxial cable round the device and a cable transmission loss can be avoided, and further an assembling process can be reduced in the process of manufacturing the device. Therefore, the manufacturing cost can be reduced. In this connection, in the same manner as that of Embodiment 4, the shielded case 6 for accommodating the control board 5, on which the wireless sending portion 2, the wireless receiving portion 3 and the control portion 4 are mounted, may be provided in this Embodiment 6.

As explained in the above Embodiments 1 to 3, when the shielded case 6 for accommodating the control board 5, on which the wireless receiving portion 2, the wireless receiving portion 3 and the control portion 4 are mounted, and the loop antenna 1 are accommodated in one housing, for example, in the case 7 made of resin, the installation work can be more easily performed.

As described above, the present invention can provide the following effects. It is possible to avoid a complicated work of adjusting the antenna resonance frequency caused when the coaxial cable is laid round the device in the case of installation. Since the cable loss is reduced, it is possible to prevent a decrease in the sending electric power. Further, it is possible to avoid an influence of the obstruction wave and noise given from the outside. Further, a place in which the device is installed is not especially limited. Therefore, it is possible to provide a small integrated antenna type non-contact IC card reader/writer, the installation of which can be easily performed.

As explained in the above Embodiments 4 to 6, when the shielded case 6 for accommodating the control board 5, on which the wireless receiving portion 2, the wireless receiving portion 3 and the control portion 4 are mounted, and the loop antenna 1 are accommodated in one housing, for example, in the case 7 made of resin, the installation work can be more easily performed.

As described above, the present invention can provide the following effects. It is possible to avoid a complicated work of adjusting the antenna resonance frequency caused when the coaxial cable is laid round the device in the case of installation. Since the cable loss is reduced, it is possible to prevent a decrease in the sending electric power. Further, it is possible to avoid an influence of the obstruction wave and noise given from the outside. Further, a place in which the device is installed is not especially limited. Therefore, it is possible to provide a small integrated antenna type non-contact IC card reader/writer, the installation of which can be easily performed.

CROSS REFERENCE TO RELATED APPLICATION

This application is based upon and claims the benefit of priority of Japanese Patent Application No. P2002-372220 filed on Dec. 24, 2002 and Japanese Patent Application No. P2002-372221 filed on Dec. 24, 2002, the contents of which are incorporated herein by reference in its entirety.

What is claimed is:

1. An integrated antenna type non-contact IC card reader/writer comprising:
    a circular or substantially rectangular or polygonal loop antenna, which supplies electric power and sending data to a non-contact IC card by electromagnetic induction and
        acquires receiving data from the non-contact IC card by a change in the load;
    a resonance matching circuit, which composes a resonance circuit for making the loop antenna resonate with a desired frequency and a matching circuit for matching impedance with a transmission line;
    a wireless sending portion, which supplies electric power and sending data to the loop antenna via the resonance matching circuit;
    a wireless receiving portion, which acquires receiving data from the loop antenna via the resonance matching circuit; and
    a control board on which the resonance matching circuit and a control portion for controlling the wireless sending portion and the wireless receiving portion are mounted, the control board being accommodated in a shielded case, wherein the components are arranged and assembled so that a central axis of the loop antenna in the thickness direction and a central axis of the shielded case in the thickness direction can be made to substantially coincide with each other.

2. The integrated antenna type non-contact IC card reader/writer according to claim 1, wherein the loop antenna and the shielded case are arranged and assembled so that a central axis of the loop antenna in the longitudinal direction and a central axis of the shielded case in the longitudinal direction can be made to coincide with each other on an opening face of the loop antenna.

3. The integrated antenna type non-contact IC card reader/writer according to claim 1, wherein the loop antenna and the shielded case are arranged and assembled so that a central axis of the loop antenna in the lateral direction and a central axis of the shielded case in the lateral direction can be made to coincide with each other on an opening face of the loop antenna.

4. The integrated antenna type non-contact IC card reader/writer according to one of claims 1 to 3, wherein an area ratio of the loop antenna to the shield case accommodating the control board, on which the control portion for controlling the wireless sending portion and wire less receiving portion is mounted, is substantially 1 to ¼ or less.

5. The integrated antenna type non-contact IC card reader/writer according to claim 4, wherein the resonance matching circuit is arranged close to the loop antenna and connected with it, and a coaxial cable, the length of which is substantially ¼ or less of the maximum diameter of the loop antenna, is used for supplying and receiving electric power and sending and receiving data between the resonance matching circuit and the wireless sending portion and also between the resonance matching circuit and the wireless receiving portion.

6. The integrated antenna type non-contact IC card reader/writer according to claim 5, wherein the loop antenna and shielded case are accommodated in one case made of resin.

7. The integrated antenna type non-contact IC card reader/writer according to claim 4, wherein the loop antenna is directly connected with a micro strip line transmission line, which extends from the resonance matching circuit provided on the control board, for supplying and receiving electric power and sending and receiving data between the loop antenna and the wireless sending portion and also between the loop antenna and the wireless receiving portion.

8. The integrated antenna type non-contact IC card reader/writer according to claim 7, wherein the loop antenna and shielded case are accommodated in one case made of resin.

9. The integrated antenna type non-contact IC card reader/writer according to claim 4, wherein the loop antenna and shielded case are accommodated in one case made of resin.

10. The integrated antenna type non-contact IC card reader/writer according to one of claims 1 to 3, wherein the resonance matching circuit is arranged close to the loop antenna and connected with it, and a coaxial cable, the length of which is substantially ¼ or less of the maximum diameter of the loop antenna, is used for supplying and receiving electric power and sending and receiving data between the resonance matching circuit and the wireless sending portion and also between the resonance matching circuit and the wireless receiving portion.

11. The integrated antenna type non-contact IC card reader/writer according to claim 10, wherein the loop antenna and shielded case are accommodated in one case made of resin.

12. The integrated antenna type non-contact IC card reader/writer according to one of claims 1 to 3, wherein the loop antenna is directly connected with a micro strip line transmission line, which extends from the resonance matching circuit provided on the control board, for supplying and receiving electric power and sending and receiving data between the loop antenna and the wireless sending portion and also between the loop antenna and the wireless receiving portion.

13. The integrated antenna type non-contact IC card reader/writer according to claim 12, wherein the loop antenna and shielded case are accommodated in one case made of resin.

14. The integrated antenna type non-contact IC card reader/writer according to one of claims 1 to 3, wherein the loop antenna and shielded case are accommodated in one case made of resin.

15. An integrated antenna type non-contact IC card reader/writer comprising:
   a circular or substantially rectangular or polygonal loop antenna, which supplies electric power and sends data to a
   non-contact IC card by electromagnetic induction and acquires receiving data from the non-contact IC card by a change in the load;
   a resonance matching circuit composing a resonance circuit for making the loop antenna resonate with a desired frequency and a matching circuit for matching impedance with a transmission line;
   a wireless sending portion, which supplies electric power and sends data to the loop antenna via the resonance matching circuit;
   a wireless receiving portion, which acquires receiving data from the loop antenna via the resonance matching circuit; and
   a control board on which the resonance matching circuit and a control portion for controlling the wireless sending portion and the wireless receiving portion are mounted, the control board being accommodated in a shielded case, wherein the loop antenna and the shielded case are arranged and assembled on the same plane being adjacent to each other.

16. The integrated antenna type non-contact IC card reader/writer according to claim 15, wherein the resonance matching circuit is arranged close to the loop antenna, and a coaxial cable, the length of which is approximately ¼ or less of the maximum diameter of the loop antenna is used for supplying and receiving electric power and sending and receiving data between the resonance matching circuit and the wireless sending portion and also between the resonance matching circuit and the wireless receiving portion.

17. The integrated antenna type non-contact IC card reader/writer according to claim 15, wherein the loop antenna is directly connected with the micro strip line transmission line extending from the resonance matching circuit provided on the control board for supplying and receiving electric power and sending and receiving data between the loop antenna and the wireless sending portion and also between the loop antenna and the wireless receiving portion.

18. The integrated antenna type non-contact IC card reader/writer according to claim 15, wherein the loop antenna and the shielded case are accommodated in one case made of resin.

* * * * *